US009064376B1

(12) United States Patent
Rubin

(10) Patent No.: US 9,064,376 B1
(45) Date of Patent: Jun. 23, 2015

(54) UTILIZATION OF MULTIPLE DEVICES TO SECURE ONLINE TRANSACTIONS

(71) Applicant: Aviel David Rubin, Pikesville, MD (US)

(72) Inventor: Aviel David Rubin, Pikesville, MD (US)

( * ) Notice: Subject to any disclaimer, the term of this patent is extended or adjusted under 35 U.S.C. 154(b) by 0 days.

(21) Appl. No.: 14/444,995

(22) Filed: Jul. 28, 2014

Related U.S. Application Data

(60) Provisional application No. 62/008,561, filed on Jun. 6, 2014.

(51) Int. Cl.
| | | |
|---|---|---|
| *A63F 13/30* | (2014.01) | |
| *G07F 17/32* | (2006.01) | |
| *H04L 29/06* | (2006.01) | |
| *A63F 13/77* | (2014.01) | |
| *A63F 13/55* | (2014.01) | |

(52) U.S. Cl.
CPC .......... *G07F 17/3241* (2013.01); *H04L 63/145* (2013.01); *G07F 17/3293* (2013.01); *A63F 13/77* (2014.09); *A63F 13/55* (2014.09); *G07F 17/3225* (2013.01); *A63F 13/30* (2014.09)

(58) Field of Classification Search
CPC ....... A63F 13/30; A63F 13/327; A63F 13/33; A63F 13/332; A63F 13/335; A63F 13/35; A63F 2300/401; A63F 2300/405; A63F 2300/406; A63F 2300/407; A63F 2300/50; A63F 2300/532; A63F 13/77; A63F 2300/40; A63F 2300/531; A63F 2300/535; G07F 17/3225; G07F 17/3293
USPC ......................................... 463/13, 16, 40–42
See application file for complete search history.

(56) References Cited

U.S. PATENT DOCUMENTS

| | | | |
|---|---|---|---|
| 6,629,890 B2 | 10/2003 | Johnson | |
| 7,736,221 B2 | 6/2010 | Black et al. | |
| 8,388,428 B1 | 3/2013 | Black et al. | |
| 8,554,680 B2 | 10/2013 | Newcombe | |
| 8,641,522 B2 | 2/2014 | Tarantino | |
| 2002/0010013 A1* | 1/2002 | Walker et al. ................... | 463/16 |
| 2007/0130150 A1 | 6/2007 | Fowler et al. | |
| 2008/0009345 A1 | 1/2008 | Bailey et al. | |
| 2008/0039203 A1* | 2/2008 | Ackley et al. ................... | 463/40 |

(Continued)

FOREIGN PATENT DOCUMENTS

| | | |
|---|---|---|
| WO | WO2009142728 | 11/2009 |
| WO | WO 2010/043722 A1 | 4/2010 |
| WO | WO2013155228 | 10/2013 |
| WO | WO2014035191 | 3/2014 |
| WO | WO2014041336 | 3/2014 |

OTHER PUBLICATIONS

RSA Security Token http://www.pokerstars.com/poker/room/features/security/rsa-token/faq/.

(Continued)

*Primary Examiner* — Damon Pierce
(74) *Attorney, Agent, or Firm* — CipherLaw

(57) ABSTRACT

The invention described herein can be configured for securing communications against malware by utilizing two devices with differential or application-specific components during an online session. The invention can determine whether both a first device and a second device are accessible and if both the first and second devices are determined to be accessible, transmitting a first subset of the information to the first device from the server and transmitting a second subset of the information to the second device from the server.

25 Claims, 10 Drawing Sheets

(56) References Cited

U.S. PATENT DOCUMENTS

| | | |
|---|---|---|
| 2008/0318651 A1* | 12/2008 | Gross et al. ............ 463/13 |
| 2009/0227375 A1* | 9/2009 | Weisman et al. ........ 463/41 |
| 2009/0292640 A1* | 11/2009 | Heatherly ............... 705/51 |
| 2012/0072561 A1* | 3/2012 | Rebacz .................. 709/223 |
| 2012/0240203 A1 | 9/2012 | Kling |
| 2012/0295587 A1 | 11/2012 | Paya et al. |
| 2013/0079131 A1 | 3/2013 | Lam et al. |
| 2014/0121015 A1* | 5/2014 | Massing et al. ......... 463/33 |
| 2014/0141864 A1* | 5/2014 | Ward et al. ............. 463/25 |
| 2014/0194176 A1* | 7/2014 | Robbins et al. ......... 463/16 |

OTHER PUBLICATIONS

Brad Arkin, Frank Hill, Scott Marks, Matt Schmid and Thomas John Walls, How We Learned to Cheat at Online Poker: A Study in Software Security, Sep. 1999.

Jeff Yan, Security Design in Online Games, Computer Security Applications Conference, 2003. Proceedings. 19th Annual, Dec. 8-12, 2003.

* cited by examiner

Prior Art

1010 username

John Doe requires second device

Yes hashed pw for first device

3987a87b87c73f3490c9d0 hashed pw for second device

98b7c73a347e789f98d342 authentication token

98234f342e324a7cd98b2a funds transfer threshold $800 link to bank account info

Pointer to banking database: 0x00123adf32
Key to user entry in bank database: 3a98c3243f Example database entry on central server
for user John Doe in banking example

UTILIZATION OF MULTIPLE DEVICES TO SECURE ONLINE TRANSACTIONS

CROSS-REFERENCE TO RELATED APPLICATIONS

This application claims priority to U.S. Provisional Application Ser. No. 62/008,561, filed on Jun. 6, 2014, entitled "Utilization of Multiple Devices to Secure Online Transactions," the entire contents of which is hereby incorporated by reference.

FIELD OF THE INVENTION

This application relates generally to securing communications against malware by utilizing two devices with differential or application-specific components during an online session.

BACKGROUND

Online applications typically run locally on computers or other computing devices such as tablets or smartphones. As depicted in FIG. 1, in the current state of the art, a game server (120) communicates with the players (115) in the game. Each of the players utilizes a single computing device (e.g., computer, phone, or tablet), and the players can communicate with the game server (120) or with each other over the Internet (110).

In other examples, the games may require a direct communication between the two devices so that two devices can be used together to play games and may not utilize an online server. Furthermore, these games do not use two devices to achieve security, nor to split up an application to protect against malware.

It is common for these computing devices to become infected with malware (i.e., malicious code that runs on the user's device). Malware can compromise the security of a user's device. When online applications involve the transfer of money, the consequences are that the attacker can steal money. For example, there are documented instances where malicious code on a user's computer has revealed confidential information to an attacker in an online game, and the attacker was able to use this information to defeat the other player and thus steal money from the victim.

Efforts to secure online applications have focused on requiring the user to install anti-virus or firewall technologies on the electronic devices to attempt to keep the malicious code from being installed or from running. However, it is not realistic to assume that average users can administer their computers and other electronic devices adequately.

Further efforts to secure online applications have involved two-factor authentication. Two-factor authentication is utilized to authenticate users, authorize transactions, or to notify users of irregularities in their accounts. In two-factor authentication, a user logs into a first device (e.g., a computer) and then uses a second device (e.g., a smartphone) as part of the authentication process. The second device receives code, for example by text or email, and the user is instructed to enter that code into the first device, where the rest of the interaction with the application takes place. Examples of two-factor authentication include RSA™ tokens and SMS notification systems. In two-factor authentication, the second device is no longer needed once the authentication takes place. Accordingly, two-factor authentication will not offer protection against malware after the authentication takes place.

BRIEF DESCRIPTION OF THE DRAWINGS

FIG. 10 illustrates an example of a database entry on the central server for a particular user in the banking example.

DETAILED DESCRIPTION

Figure 1:
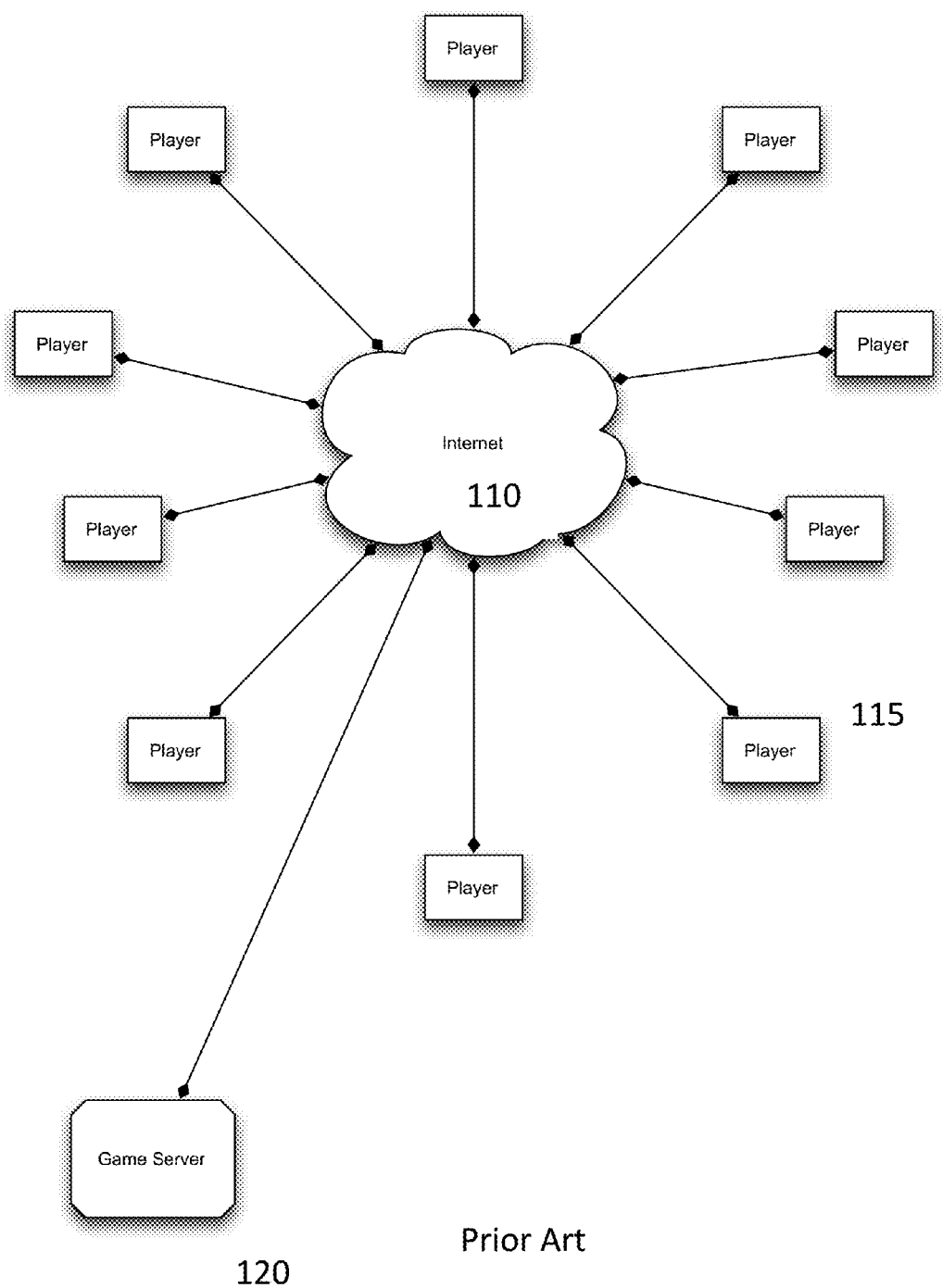
FIG. 1 illustrates an example a prior art architecture for online games.

The present invention describes a system where the user has persistent use of a first device and a second device throughout the use of an online application to prevent a compromise of the transaction if malware infects either device. Whereas two-factor authentication in the prior art is application-agnostic and takes place before a user engages in the specific functionality of a particular application, the present invention includes a system that utilizes the two devices at multiple times, and in some cases persistently and/or continuously, during an online session and includes application-specific components in each of the devices.

The present invention includes an architecture whereby a user's interaction with an application includes a first device, which can be a computer, a tablet, a smartphone or other electronic device and second device, such as a computer, tablet, smartphone or another type of electronic device. Any combination of electronic devices can be used.

One preferred embodiment of the invention is directed to online games. However, the invention may also be used in any other domain, such as online banking, mobile healthcare, online investing, and other online activities that would benefit from enhanced security against malware on a user's computing device. Although the preferred embodiment is described using the game of poker as an example, this example is non-limiting and the preferred embodiment could apply to any online game.

One example application of the invention is to a game of Texas Holdem, which is a form of poker in which every player receives two secret "hole" cards from a standard deck of 52 playing cards. The cards in the deck can be in any of four suits, namely, clubs, spades, hearts, and diamonds, and there are 13 ranks of cards, 2, 3, 4, 5, 6, 7, 8, 9, 10, J, Q, K, A, with one card of each rank in each suit.

After each user receives two hole cards, there is a round of betting. Then, three community cards are dealt, which everybody sees. Then there is another round of betting. Next, a fourth community card (the "turn") is dealt that everybody sees. Next, there is another round of betting. Finally, the fifth and last community card (the "river") is dealt, and then there is a final round of betting. After the last round of betting, the player with the best five card poker hand out of the seven cards that include the five community cards and the two hole cards of that player, wins. Texas Holdem is often played online, where the players are in remote locations, using the Internet to communicate with a centralized game server. The centralized game server randomizes the cards (shuffles the deck), and deals the cards to the players.

In some embodiments, a player runs gaming software on a first device. In the case of the poker example described herein, the game server does not communicate certain sensitive information (such as, for example, the user's hole cards) to the first device. The player's sensitive information (e.g., the user's hole cards) are therefore not displayed on the first device. Accordingly, because the sensitive information is not displayed or transmitted to the first device, an attacker using malware cannot gain access to the sensitive information.

In the preferred embodiment, the user also utilizes a second device. Everything that is known and displayed on the first device is considered to be public information, and the only private, sensitive information exists on or is transmitted to a separate electronic device.

The game server communicates the user's sensitive information (e.g., the user's hole cards) to the second device via a separate communication channel, such as a different Internet connection, or via the cellular phone network. The second device then displays the sensitive information to the user. The game server may communicate additional sensitive information to the second device.

Figure 2:
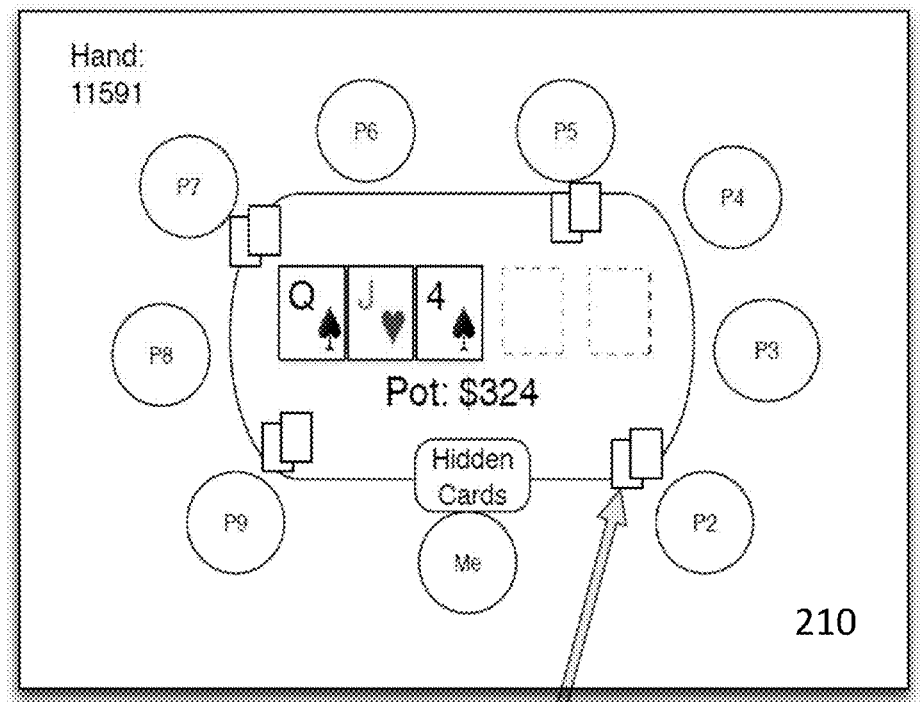
FIG. 2 illustrates an example of running a persistent authentication application whereby an identifier links two separate computing devices.

In one example of a preferred embodiment, illustrated in FIG. 2, a user is playing online poker, and the user sees the same view of a table as is common in online poker, but the hole cards are not displayed (210). In this embodiment, the user runs a separate app on a second device (215) that uses its own authentication (which can be different from the authentication required on the first device), and over that channel, the game server sends the user the hole cards for that hand. An identifier is used to link the current hand on the first device to the hole cards that are displayed on the second device.

Figure 5:
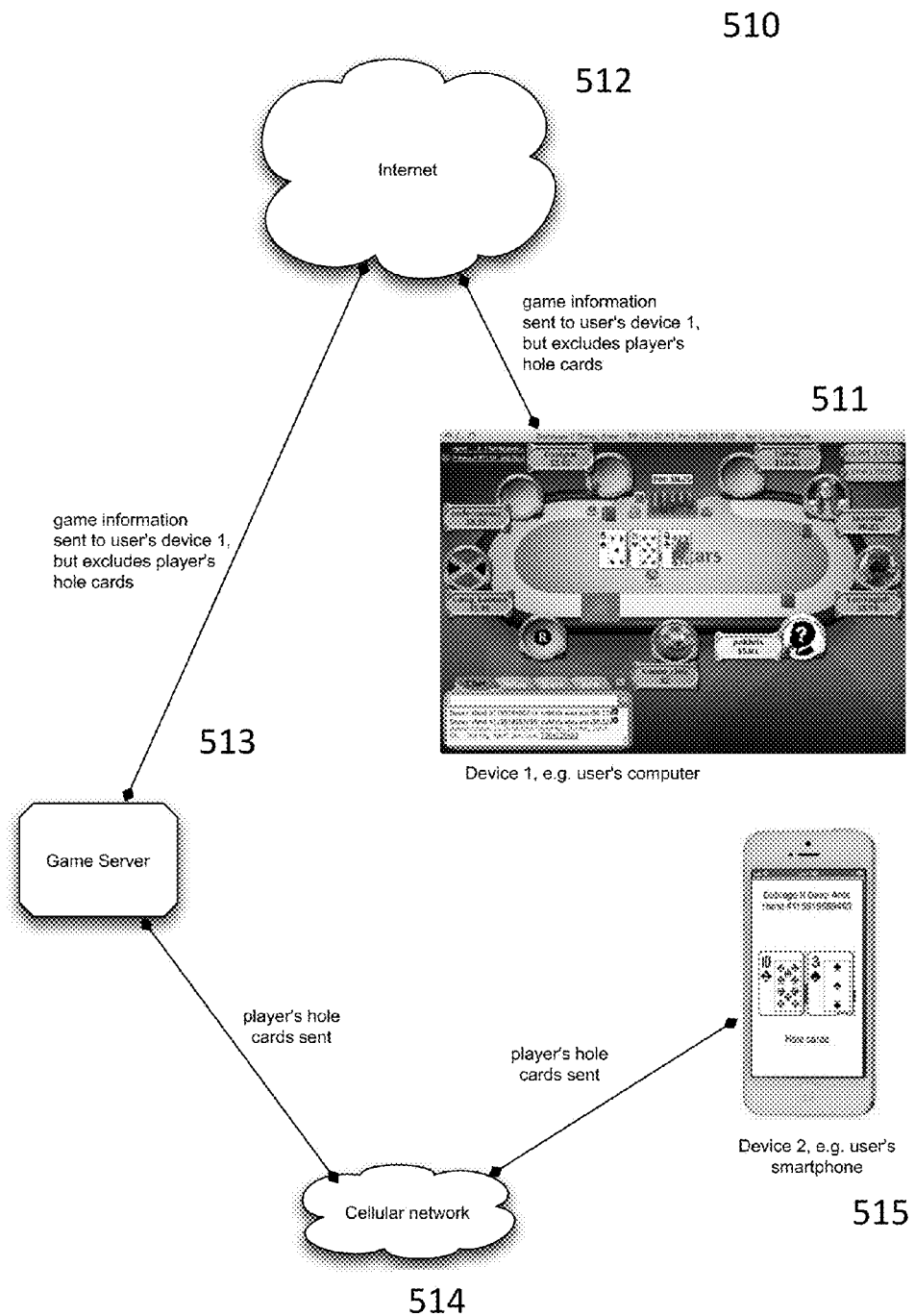
FIG. 5 illustrates an example in which a game server sends information about the user's hole cards to the second device over the cellular network as a text message.

In another example of a preferred embodiment, the user may receive the sensitive information as an SMS or other kind of text message and does not have to run a specialized application on a second device. One illustration of this example is depicted in FIG. 5. With reference to this example (510), the user can register a mobile phone number on which to receive sensitive information messages and can see the cards as a text message (515). A player engaged in a game will receive information about the game on a first device (511). This information will be transmitted to the first device (511) from the game server (513) through the Internet (512), but will exclude sensitive information such as hole cards. In turn, the server (513) will verify the player and will send the sensitive information to a cellular network (514), which will be transmitted to a user's second device (515).

For example, the sensitive card information could be "Ah3c", representing the ace of hearts and the three of clubs. Alternatively, the user can utilize an application that would translate this text into pictures of the cards that are displayed to the user. In another example of the preferred embodiment, the user runs an app on a smartphone that communicates with the game server and receives and displays the user's hole cards.

Figure 6:
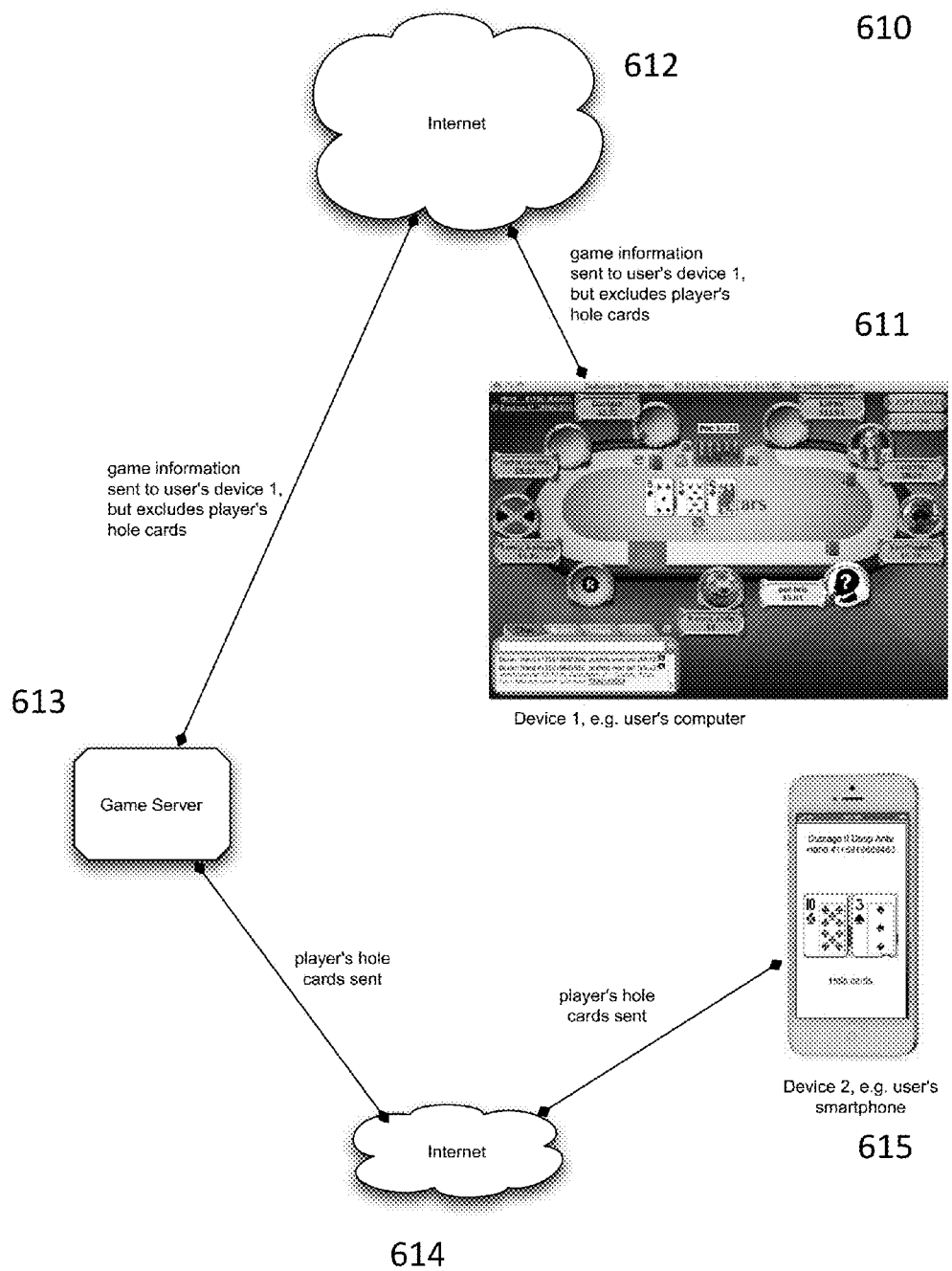
FIG. 6 illustrates another example where the game server sends the user hole cards over a separate Internet connection.

In another example, the user can receive the information about sensitive information over the Internet, as depicted in FIG. 6 (610), As illustrated in this figure, a player engaged in a game can receive information about the game on a first device (611). This information will be transmitted through the Internet (612) from the game server (613). The game server (613) will verify the player and will send the user's sensitive information over a separate Internet connection (614) to the user's second device (615) via the Internet connection.

Figure 7:
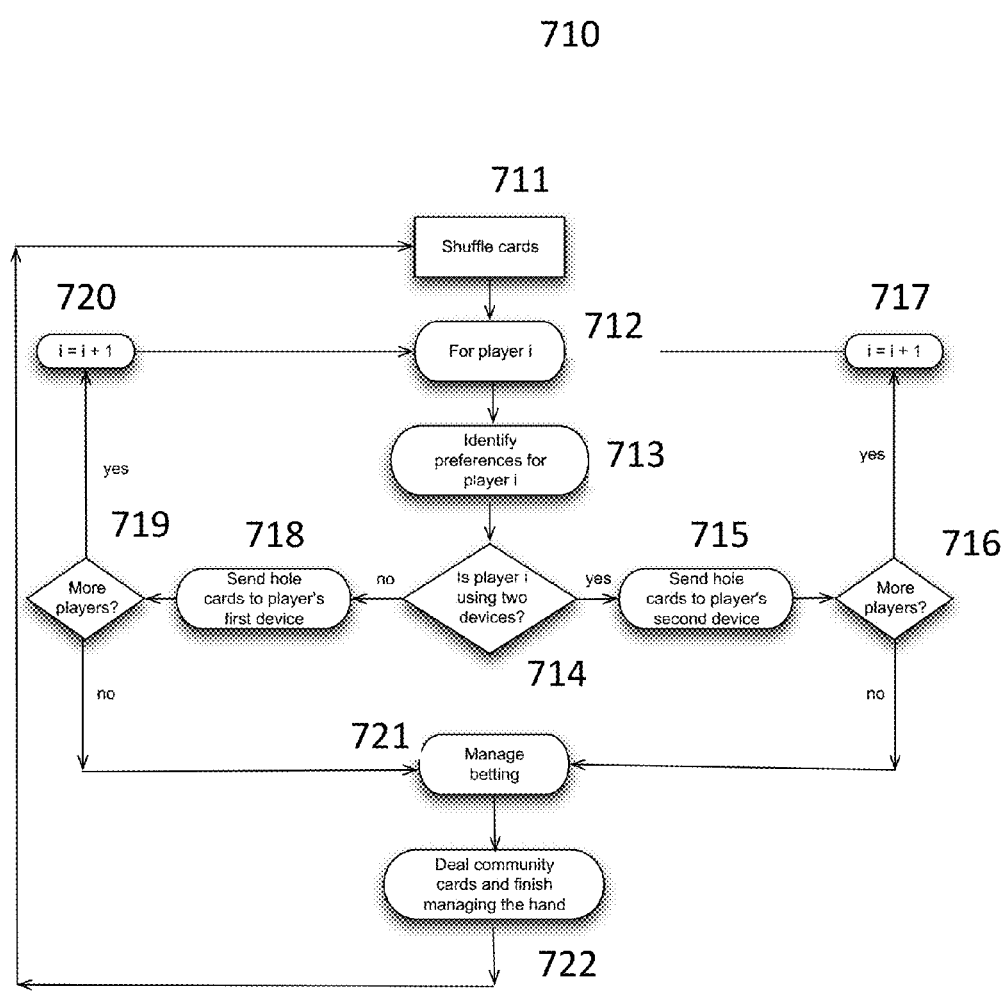
FIG. 7 illustrates an example flow of control for a poker hand at the game server.

With reference to the example illustrated in FIG. 7, the dealer will shuffle cards (711) or send other information to the player (712). The first device will determine or identify preferences for the player (713) and will determine whether the player is using two computing devices (714). If the player is not using two devices, the sensitive information will be sent to the first device (718). On the other hand, if the user is using two devices, the sensitive information will be sent to the second device (715). In either situation, the betting can be managed (721, 722) and multiple players can be involved (717, 720). While the example illustrated in FIG. 7 references a card game, the same methods can be generalized to a broad range of environments.

In one embodiment, the second device returns an acknowledgement to the game server indicating that the sensitive information, such as hole cards, was received. The game server then communicates to the first device an indication that the second device has received the hole cards. If it is the user's turn to act in the poker game, and the first device has not received the indication that the second device has received the hole cards, then the user's turn is delayed, and the user is charged time against the user's time bank until the user either receives an indication that the cards have been received, or until the time bank is exhausted, at which point the user is folded out of the hand. If the user notices that there is a problem with the second device not receiving the hole cards in time, and if this affects his ability to play the game, the user may elect to downgrade the user's security and to receive his hole cards on the first device, until such time as the problem is rectified.

In one example embodiment, once the first device receives an indication that the second device has received sensitive information, the first device can display a visual cue that the second device has received the cards, for example, by changing the color of a box that symbolizes the sensitive information, or by highlighting the text in the box. For example, as illustrated in FIG. 2, the box that shows the hidden hole cards on the second device (215) can change from red to green, and/or the outline of the box can have a shadow added. In this manner, the user is made aware that he can now act on his hand when it is his turn.

In some embodiments, the server can be configured to determine whether both a first device and a second device are accessible over at least one electronic communications network. According to one embodiment, the server maintains a heartbeat message with the second device. This can be a simple ping message (e.g., via ICMP) or a short message over an existing TCP/IP connection. In some embodiments, the determination of accessibility can be made by transmitting arbitrary packets over a TCP connection and receiving an acknowledgment and inaccessibility determined by the absence of an acknowledgement. In this manner, the server can determine the status and availability of the second device. In the event that there is a network connection disruption with the second device, the server may attempt to switch communication mechanisms to use text message instead of the Internet. Alternatively or in addition, the server may terminate the session.

If the game server remains unable to communicate with the second device, the game server can indicate to the first device that the second device is unavailable, and the first device can display a warning to the user that the second device is not reachable. In this event, the poker game can proceed. For example, if the second device is not reachable from the game server, the user can be forced to sit out until such time as the user's two devices are reachable. At any point, the user can elect to switch to not using two devices, if the user is willing to assume the risk and wants to continue to play.

According to one embodiment, each user of an online game site can choose from several alternatives on how the user wants to receive sensitive information, thus balancing security needs with convenience. The choices can include, but are not limited to:

(1) no change from the status quo: the sensitive information is visible at the poker table on one device;

(2) receiving the sensitive information over the Internet on a second, networked device by running an application (app) on that second device;

(3) receiving the sensitive information as a cellular text message on a second device, which can be display as text or as an image or images.

The user may also elect to change the choice at some of all of the times the user plays, based on the user's circumstances and perceived level of risk. For example, if playing a low stakes game, the user may elect to receive and view the user's sensitive information on the first device, or if there is an area of low cellular coverage, the user may elect not to receive the sensitive information on a second device as a text message. The above examples are only illustrative and other ways in which the user can elect to receive sensitive information on a second device could be implemented.

According to another embodiment of the invention, each player can decide what level of security the user is most comfortable with, and the game server can support either one. At any time, any player may elect to switch to a different level of security by receiving the user's sensitive information in a different way. This method may be utilized by some players, but need not necessarily be utilized by all players.

In one implementation of the preferred embodiment, the game server adds an identifier to the second device that is visible only to the player. This identifier can be, for example, a number, color, or any other identifier that signifies a new hand. In this manner, the player can be assured that the hole cards the user is viewing on the first device correspond to the correct poker table. This improves the chances that the user will correctly match up the hole cards with the poker table. It is preferable, for security reasons, that the identifier shown on the second device not contain any information that would allow an attacker to find the player at the poker site.

Figure 3:
FIG. 3 illustrates an example display on a second device incorporating additional information.

In another implementation of the preferred embodiment, the user sees the entire poker table on the second device, rather than just the hole cards, as illustrated in FIG. 3 (310). In this implementation, the game server sends the second device additional information such as the identities of the other players and their stack sizes. In this implementation, the second device can be only informational, and no actions can be executed from it.

After the hand is completed, when any exposed cards, such as at a showdown, are sent to the player, the hidden hole cards can be sent to the first device, so that they can be stored in hand histories that are kept on the first device. More generally, after the information has diminished value, for example because the hand is completed, the information previously only visible on the second device can be sent to the first device. Beyond this particular application, many different types of information can lose some, or all, of its value due to (a) passage of time, (b) sequence of events such that the risk to combine the information from two devices on the same device is acceptable.

Multi-Tabling Function

According to some embodiments, there may be players who play at more than one virtual table at a time. This is a common practice in online poker and may be referred to as "multi-tabling."

Figure 4:
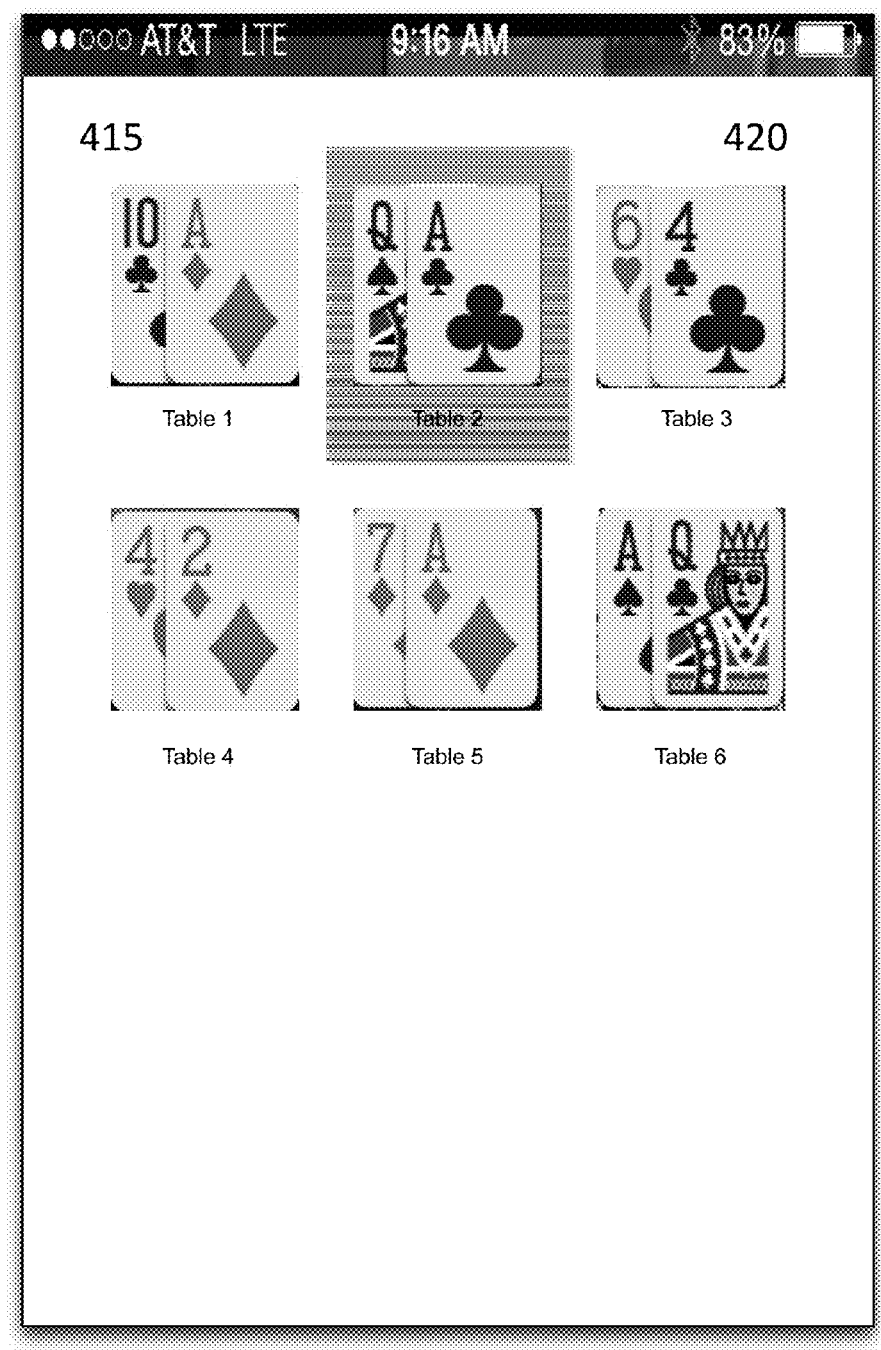
FIG. 4 illustrates an example screen layout for a compact device, such as a smartphone.

If the second device has a big enough screen, and if there are few enough tables, the second device may be able to display the sensitive information for all of the tables at the same time. However, even if the screen is small, the system can display the information from a variety of tables on the second device. FIG. 4 illustrates an example of a screen layout depicting hole cards from a variety of tables (415). As illustrated in FIG. 4, the active hand is highlighted on the second device (420).

Some embodiments of the present invention include mechanisms for supporting multi-tabling, even where the user can only see one poker hand at a time on a second device.

Embodiments can include one or more ways of synchronizing the active poker table on the first device with the second device. One way to link the active table on the first device with the cards displayed on the second device is to perform a visual enhancement to each table, such as a special border, a skin, or a color scheme, and then to match that on the second device. For example, if the second device is a smartphone, and the smartphone displays a pair of hole cards on the screen, the user can swipe to the left or right within the smartphone application and thus scroll through hole cards for different hands. Each hand may have a visual cue that is similar to a visual cue (e.g., color, a border, or some other marking) that matches a similar visual cue on that poker table on the first device.

Another way to keep the two devices synchronized is for the first device to communicate to the game server which table currently has the focus, and the game server can then relay that information to the second device over the independent channel.

Yet another way that the two devices can remain synchronized is for the application on the first device and the application on the second device to share a direct communication line such as Bluetooth, WiFi, or some other way of communicating. The first device would then send the second device the information about which poker hand is currently active. In some embodiments, this channel may not be utilized for any other purpose and that the communication be one way—from the first device to the second device, to avoid creating a vector of attack.

Yet another way that the user can keep track of which poker hand corresponds to which table is to display additional information in the second device, such as the names of the other players at the table and/or the community cards and/or the pot size, or any other information that would help the user associate the current hole cards on the second device to a particular poker table on the first device. In this example of the preferred embodiment, the game server communicates the additional information to the second device, in addition to the hole cards.

Any of the foregoing synchronization methods can be utilized alone or in conjunction with any of the other synchronization methods described above.

In the preferred embodiment, the online poker server implements the functionality described above. In another embodiment, the described functionality can be implemented for legacy systems by incorporating a trusted proxy. The trusted proxy can be implemented by the entity that is running the online gaming server or by a third party.

In the trusted proxy solution, the gaming server need not be aware of the fact that a player is utilizing two devices, and the player registers a second device with the proxy server instead of with the gaming server. The communication between the online gaming server and the proxy mimics the communication between the online gaming server and a gaming client in the prior art systems. In this example, the online gaming server sends information, including the user's hole cards to the proxy, and the proxy implements the functionality of sending the hole cards only to the user's second device.

The online proxy can be implemented with only modest changes to the client software. In one example of implementing the client in the trusted proxy example, the client on the first device is programmed to not receive hole cards, and displays an indication to the user that the cards are not known to the device. In an alternate implementation, fake cards are sent by the proxy to the client on the first device. For example, the proxy could, on multiple occasions, send the two of hearts and the two of diamonds to the client which would display those two cards to the user. The player would know that these cards were only placeholders and not the actual cards that were dealt. The player would see the actual hole cards on the second device. This solution requires that the legacy client not check for cases such as where the two of hearts is sent to the user and where the same card also shows up in the community cards. Furthermore, such a client would rely on the server to indicate who won the hand, as the cards represented on the first device would not be the actual cards.

In the preferred embodiment of the trusted proxy solution, a client is implemented that is aware of the two devices being used, whereas the online gaming server may or may not be aware of the existence of the trusted proxy.

On-Line Banking Embodiments

Another embodiment of the present invention can be applied to online banking applications. This embodiment includes a system and method for users to use their first device and their second device at the same time, to protect against malware on either one.

In one example of this embodiment, a banking application can require that users log into the user's bank account from a first device and also from a second device, and that the user perform some action on each of those devices before the action is authorized.

In another example of this embodiment, the user requests some information on the first device and can only view it on the second device. For example, the user can use the bank's website on the user's computer to request a balance in an account, and the user can then view the balance on the second device, but not on the first device.

This embodiment involves splitting the transaction into different components, where at least one of the application-specific components of the application requires a first device and one of the other application-specific components requires a second device. The use of the two devices is related to an application-specific activity, such as viewing an account balance or performing a funds transfer, or performing a bill payment.

In the example of a transaction, if the user wants to perform a funds transfer in a banking application, the application is split up into two components, one of which runs on the user's first device, and the other runs on a second device. It is understood that this is one example, and that the two application components can run on two computers or on a combination of smartphones, tablets or computers.

Figure 8:
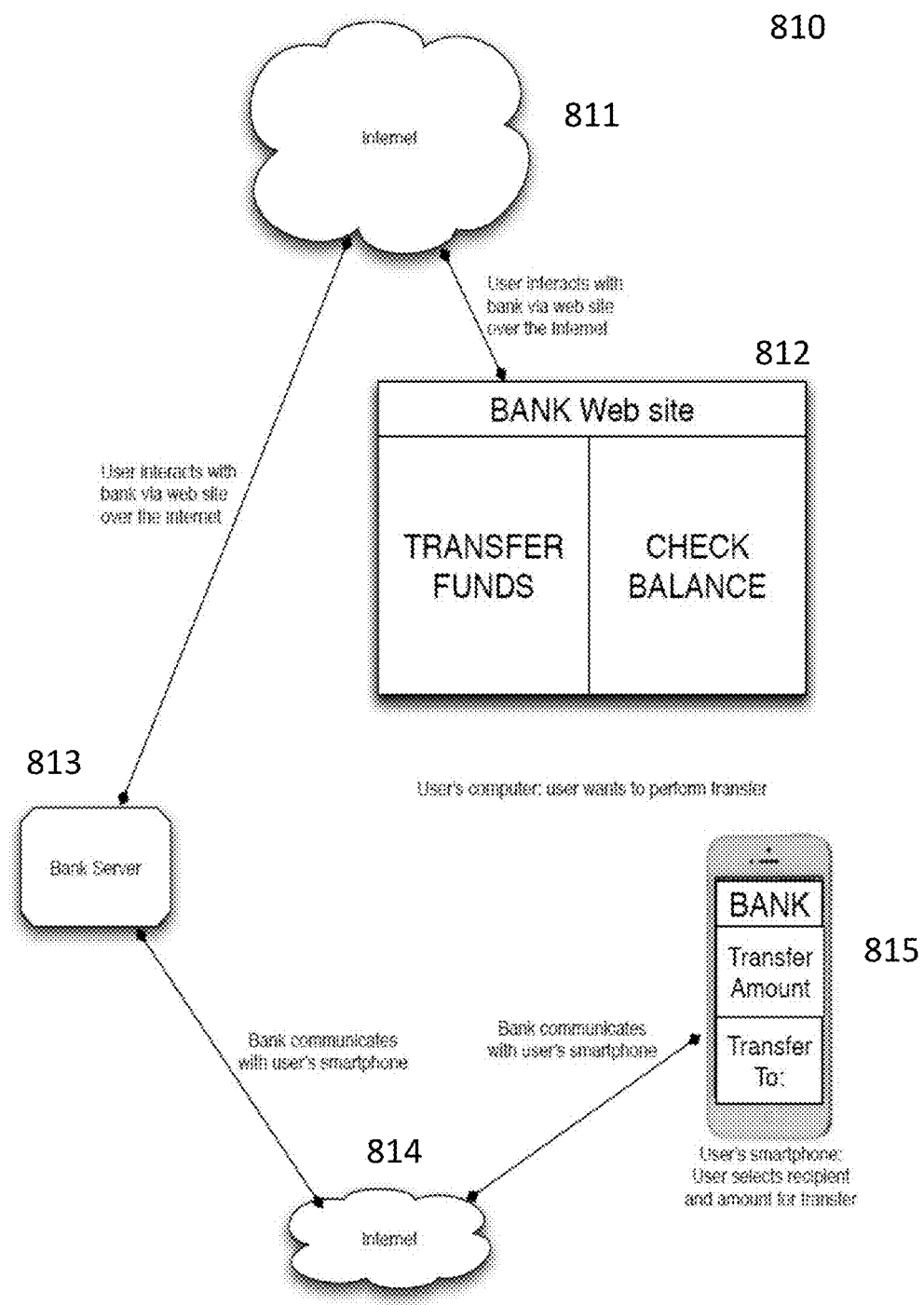
FIG. 8 illustrates an architecture for an embodiment of the present invention in a banking application.

In the example illustrated in FIG. 8, the banking application is split into two components. On a first device, a user with a web browser logs in and initiates a transaction. The bank then communicates with the user's second device over an independent Internet channel to obtain details about the desired transaction. For example, as illustrated in FIG. 8, the user indicates over the internet (811), via the first device (812), that the user wishes to perform a transfer. The bank server (813) communicates with the user's second device over the internet (814). Next, using the second device component of the application (815), the user can select the accounts to transfer to/from as well as the amount. In this manner, different parts of the experience of performing a banking transaction occur on different devices.

In some embodiments, no restriction is placed on the account, and there is no re-authentication of the user. The system can include an application where the user utilizes an application that has been designed to utilize two different devices, to avoid the threat of malware, not explicitly for user authentication.

The communication with the first device could be over the Internet, and the communication with the second device could be over a separate Internet connection or via text message, or some other communication channel to the second device, such as a smartphone or tablet, in addition to logging into their account on their computers.

Similarly, an online investment application where the user purchases stocks could be split so that the user performs an application-specific action on a first device and another application-specific action on a second device, where sensitive information is not displayed on the first device, but instead is displayed to the user on the second device. Any number of application domains could utilize the present invention to provide security against malware on a user's first device and thus hide sensitive information from an attacker who has compromised the first device.

Below are additional non-limiting, illustrative examples of different types of banking transactions and how they can be split using into steps performed on two separate devices that communicate with a bank server over independent communication channels to protect the user's banking information and the user's funds against malware on the user's devices. Other variations for splitting the transaction are possible.

Account balance inquiry: A user initiates a request to view the account balance on a first device, and the account balance is displayed on the second device. Thus, malware on the first device cannot obtain or view account balances.

Funds transfer: This example is illustrated and described above where a user initiates a funds transfer on a first device, and the amount and designated recipient are entered on the second device. It should be noted that other combinations of splitting are possible, for example, in another embodiment the user may indicate the recipient on the first device and the amount on the second device.

Bill Payment: In this example, a user initiates a request to pay a bill in online bill pay on a first device, and then on the second device, the user chooses a recipient and the amount. Another way this could be implemented is to choose the recipient on the first device and the amount of the bill and the date of payment on the second device. The present invention can also be utilized to add a new payee to online bill pay. The user could request to add a new payee on the first device, and then enter the name and address of the payee on the second device. Other ways of splitting up the various tasks in the bill pay activities are possible.

Linking to an external account: In this example, a user wants to link an external bank account to the user's bank account. In one embodiment, the user initiates a request to link accounts on the first device. Then, the user enters the account details for the external account on the second device.

Other banking activities: Other activities that the user performs with the user's online bank can be split up in a similar manner to the examples given above, where the user performs part of the activity on the first device such that even if an attacker compromised the first device, the attacker would not be able to do anything damaging, and part of the activity is performed on a second device. Only the combination of the actions performed on the two devices will cause the user action to succeed.

There are many ways that the central banking server can implement the present invention. For example, the banking server could implement a system-wide threshold for funds transfers. A bank could specify that, for any transaction over $3,000 in this example, the user must use a second device and a split application. (A split application refers to an application as described above where part of the transaction is performed on a first device and part of the transaction is performed on a second device.) Individual users may specify lower thresholds for their accounts. For example, a user may specify that any funds transfer over $500 requires a second device and a split application. Thus, in this example, some users who may be more security conscious and who may be comfortable using their smartphone more often may set their own thresholds for certain activities, and other users may default to the system-wide threshold set by the bank.

The splitting up of applications in banking transactions into application-specific components, as described above, can be done in conjunction with other security mechanisms known in the prior art such as two-factor authentication or two-factor transaction confirmations.

Application-specific components of an online application can include functions within the application that are specific to that application. For example, two-factor authentication is not considered to be application-specific because two-factor authentication is usually implemented generically as part of many different types of applications. Two-factor authentication can be implemented in conjunction with online banking, online healthcare, or online gaming. By contrast, an application-specific component of an online application may be a subset of the functionality of the application itself. For example, in online banking, an application-specific component is the function for a user to elect an option to check the account balance. Another example of an application-specific component of online banking is the function by which user designates a payee in online bill pay. These application-specific components may or may not be relevant in other contexts. For example, functionality for a user to check a balance in an online bank account may not be used in an online healthcare application for accessing private medical records because it is specific to the online banking application.

Another way that a bank can improve its security with the present invention is by using its existing or new heuristics for detecting possible suspicious activity to increase its level of security requirements. For example, the bank may detect an abnormal amount of activity in one account that normally only performs a few transactions a month. In that instance, the bank could require that all future transactions in that account utilize a split application and two devices as per the present invention until there is a satisfactory explanation for the increased activity. Once the bank is satisfied that the activity is legitimate, it can reduce the need for increased security and allow standard transactions through its web server. In this manner, the present invention allows suspicious accounts that are actually not involved in anything inappropriate to continue to function instead of locking those accounts and inconveniencing its customers.

Figure 9:
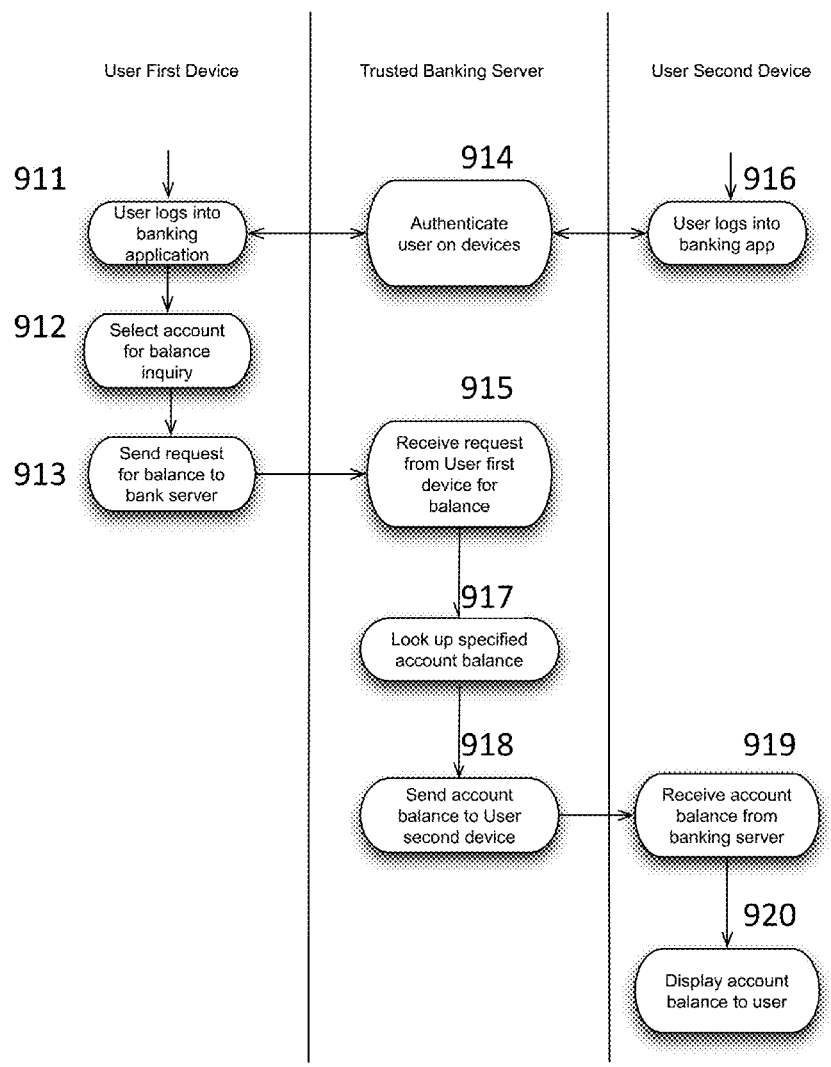
FIG. 9 illustrates an example of the communication among the central banking server, the user's first device and the user's second device.

As illustrated in FIG. 9, using a first device, a user logs into a banking application (911), selects an account for balance inquiry (912), and sends a request for a balance to a bank server (913). Using a second device, the user logs into a banking application (916). A banking server authenticates the user on the two devices (914). The banking server then receives a request form a user on the first device for a balance (915), looks up the specified account balance (917), sends the account balance to the user on the second device (918). The second device receives the account balance from the banking server (919), and displays the account balance to the user (920).

FIG. 10 illustrates an example of a database entry on the central server for a particular user in the banking example. The central server can store hashes of the passwords that are used on the first device and the second device. When a user submits a password on a device, the device hashes the password and sends the hash to the central server over a secure connection (e.g., SSL). The central server extracts the stored password from the database shown in the figure and compares the two. If they match, then authentication is successful. The figure shows that the database may store the authentication token as described above, as well as information about the user's preferences, such as the dollar amount above which use of a second device is required for funds transfers.

Sensitive Healthcare Information Embodiment

In another embodiment of the present invention, the invention is utilized to help protect sensitive healthcare information. In this embodiment, a user logs into a healthcare portal to access the user's medical records. The application is split such that most of the interaction between the user and the healthcare records system is via the user's first device. Additionally, the user also utilizes a second device, and the healthcare information server communicates over an independent channel with the user's second device.

For example, if a user wishes to view sensitive medical records, the user would log into the healthcare information portal via a first device and request the specific information that is desired to view. Once the user has indicated which records are desired, the healthcare information server sends those records either via text message or over an independent Internet connection to the user's second device. Thus, if the user's first device is infected with malware that allows an attacker to view the screen, the attacker will still not be able to see any sensitive records. The only way to compromise the user's healthcare information would be to compromise both the user's first device and the user's second device, in this example.

Examples of Second Device Customization

In some embodiments, the second device can be off-the-shelf or customized. The user's second device may be, for example, a custom electronic device that is specifically built to help secure applications. This type of second device can be built with security as the motivating factor, and it can be a simplified electronic system that is not running full versions of a standard operating system. In this embodiment, the second device runs only software and hardware necessary to provide a split application functionality according to the present invention. A single such second device can be designed to support multiple types of applications at the same time.

As a non-limiting example, the second device can be an electronic device with a processor, a screen and a network interface that can communicate with a central application server to display content related to a particular networked application, but which is designed not to allow the user to download new applications. In this way, the custom second device may be relatively less vulnerable to malware.

Applications can be split such that the user can use the first device for part of the communication with the user, and the custom second device over an independent communication channel for the remainder of the communication with the user, as described below. For example, the user can perform some, most, or all, of the actions in an application using the first device, but then when it is time for the central server to communicate sensitive information to the user, that information is sent to the second device, which displays it to the user. The custom second device can be configured such that it has a keyboard and other data entry mechanisms, such as a mouse or a touch sensor, allowing additional functionality in the second device.

The custom second device can optionally be initialized with security keys and cryptographic tokens, allowing the second device authentication capabilities, in addition to or instead of authentication by the user. For example, the device can be loaded with client SSL private keys and certificates, allowing the server to directly authenticate the custom second device. Additionally, user authentication inside of an application can allow for even greater security. Since the custom second device may be much less vulnerable to malware than a standard computer, tablet or smartphone, these pre-loaded keys and cryptographic tokens are correspondingly less vulnerable to malware infections.

Examples of Independent Communication Channels

In some embodiments, the first and second devices can be used through a single or a plurality of communication channels between a central server and the devices of the user. By utilizing independent communication channels, the devices can be further protected from each other.

As a non-limiting example, the first device can be connected to the Internet in a user's home. This type of a connection typically involves an Internet Service Provider (ISP) that links the user's home to the Internet, such as over fiber optics, cable modem, DSL, or any other means of connecting users to the Internet. In the home, the user typically utilizes a modem that provides for a Local Area Network (LAN) for the devices in the home. The user may connect to the LAN via Ethernet cable or wirelessly via WiFi or via some combination of wired and wireless connections. The second device may communicate with the central server via any one of multiple mechanisms. For example, the central server may utilize text messages via SMS to communicate with the second device. Or, the user can connect the second device to the Internet either via the cellular network's Internet service such as a 3G or 4G (e.g., LTE) network or similar networks of the cellular provider, or using WiFi. There are some security benefits to connecting the second device to the Internet via a network other than the home network, but the protection from malware is achieved even if the first and second device are on the same WiFi home network, and the network paths to the central server are thus still independent.

Examples of Device Registration

The first and second devices can either be unregistered or can be registered with the central server. As a non-limiting example, while interacting with the central server via use of the first device, the user can indicate via an application menu selection or by entering a configuration mode or preferences screen in the application that he or she wishes to add a device and to require the use of the new device in the application. The user can then include information about the device, such as whether it is a computer, a tablet or a smartphone.

At registration time, upon receiving a request to add a second device from a user's first device, the central server creates a new database entry or adds fields to an existing database record for the user for storing information about the user's second device. Next, in this example, the user initiates a connection to the central server from the second device, and the central server correlates the communication from the second device with the database entry created or modified based on earlier communication with the first device. In this embodiment, the central server creates authentication information, such as a 256-bit random number and sends that authentication information to the first device. Upon registering the second device, the user enters the authentication information into the second device to complete the registration. The authentication information, consisting of a 256 bit random string, in this example, can be converted into a human readable ASCII string using, for example, uuencoding, such that the user can read it and enter it into the second device. The central server uses the authentication information to ensure that only the actual user adds a new device, and that the new device that is added is added to the account of the correct user.

If the first device is compromised by malware, then the attacker controlling the malware can learn the user's password. If the same authentication means is used for both devices, then the attacker could conceivably connect to the server with an illegitimate second device and impersonate the user. In some embodiments, the central server stores two different means of authenticating the user. One means of authentication, in some cases a password, is stored for authenticating the user on the first device, and a second means of authentication, possibly a different password, is stored to authenticate the user on the second device. Thus, two separate authentications can be used to prevent some attacks. In another embodiment, the central server and the second device can agree on a secret value, such as an authentication token, that is stored on the second device and in the central server database. Whenever the second device communicates with the central server, the authentication token is used, such that any device without the authentication token cannot act as the second device.

The authentication token can be derived by combining (e.g., via xor or Diffie Helman key exchange or similar protocol) a secret value generated on the second device and a secret value generated on the secure server, during device registration.

It should be noted that if an authentication token is used on the second device, then the user will be limited to using that specific device whenever using the application with the central server. If it is desired to be able to use different devices to serve as the second device in the application, then the authentication should be limited to the user entering authentication information, such as a password, into the second device, which can then be any device that contains the appropriate application software.

In addition to creating a database entry or adding to an existing database record for the user, the central server may also store in its database, user preferences, such as in the game of poker, whether or not the user prefers to receive hole cards on the first device or on the second device. Or, for example, in the banking application, the central server can store user-specific information in the database corresponding to the user's threshold for transaction amounts that require performing some part of a transaction in a split way on a first device and on a second device to protect the user form malware on either of the devices as described in detail above.

Example System Components

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Ruby™, Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any operating system or environment executing in a virtualized or non-virtualized environment, using any programming language suitable for software development, including, but not limited to, different versions of Microsoft Windows™, Android™, Apple™ Mac™, iOS™, Unix™/X-Windows™, Linux™, etc. The system could be implemented using a web application framework, such as Ruby on Rails.

The processing system can be in communication with a computerized data storage system. The data storage system can include a non-relational or relational data store, such as a MySQL™ or other relational database. Other physical and logical database types could be used. The data store may be a database server, such as PostgreSQL™, MongoDB™, Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. The figures herein represent example use cases for the syntactic tagging system and are not intended to be limiting on the scope of the invention. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What is claimed is:

1. A method for transmitting information to multiple electronic devices, the method comprising:
   electronically storing a set of information at a server;
   identifying a first subset of the information and identifying a second subset of the information, wherein the first and second subsets of information are generated by the same application at the server and are specific to that application;
   determining at the server whether both a first device in possession of and being directly operated by a first user and a second device also in possession of and being directly operated by the first user are accessible over at least one electronic communications network based on the first user being logged into the application at both the first and second devices;
   if and only if both the first and second devices are determined to be accessible by the server, then:
   transmitting a first subset of the information to the first device from the server; and
   transmitting a second subset of the information to the second device from the server,
   wherein the second subset of the information includes information not transmitted to the first device.

2. The method of claim 1, further comprising transmitting at least a portion of the first subset of the information to the second device from the server only if both the first and second devices are determined to be accessible by the server.

3. The method of claim 1, wherein
   the first subset of the information comprises non-sensitive information; and
   the second subset of the information comprises sensitive information.

4. The method of claim 1, wherein the information received at the second device is more sensitive than the information received at the first device.

5. The method of claim 1, further comprising:
   determining if connectivity between the server and the second device has been disrupted; and
   providing a notification on the second device that the connectivity has been disrupted.

6. The method of claim 5, further comprising determining by an absence of a heartbeat if the connectivity has been disrupted and receiving an election from the user whether or not to switch to using only the first device for subsequent communications.

7. The method of claim 1, further comprising:
   detecting whether the second device has received the second subset of the information;
   displaying the second subset of the information on the second device; and
   generating an indicator on the first device indicating that the second device has received the second subset of the information.

8. The method of claim 7, wherein if the first device has not received the indication that the second device has received the second subset of the information, then a user's turn in an online game is delayed.

9. The method of claim 1, wherein the transmitting a first subset of the information to the first device from the server and transmitting a second subset of the information to the second device from the server are executed over independent electronic communications networks.

10. The method of claim 1, further comprising displaying a graphical identifier on the first device and a corresponding graphical indicator on the second device indicating a link between the information displayed on the respective devices.

11. The method of claim 10, wherein the information linked at the second device comprises hole cards and the information linked at the first device comprises community cards in a hand in a game of poker.

12. The method of claim 1, wherein the information received at the second device is a user's private cards in an online card game.

13. The method of claim 1, wherein the a display on the first device is being viewed exclusively by a first user and a display on a second device is also being viewed exclusively by the first user.

14. The method of claim 1, wherein, neither the first subset of information nor the second subset comprise a two factor authentication code.

15. The method of claim 1, wherein the server is a proxy server configured to relay communications from an application server to the first and second devices wherein the proxy server emulates a client to the application server.

16. The method of claim 1, further comprising configuring the server for managing an online game, and wherein the server is configured to communicate with a plurality of devices including a first electronic device and a second electronic device, wherein the first electronic device is primarily used to play the game, and wherein in the game server communicates sensitive information to the second electronic device so that sensitive information can be presented to a user.

17. The method of claim 16, wherein the online game is poker and wherein the information that is communicated to the second device includes hole cards.

18. The method of claim 17, wherein the first device provides a visual mark on each of multiple tables that is displayed that matches a visual mark on the hole cards that are displayed on the second device to keep the hole cards and the tables synchronized.

19. The method of claim 17, wherein the game server provides information to identify the table to which table the hole cards belong.

20. The method of claim 17, wherein the first device communicates to the game server which table has focus, and wherein the game server then communicates to the second device an instruction to display the hole cards that correspond to an active table that has the focus in the first device.

21. The method of claim 17, wherein a user is playing more than one poker table, and wherein the first device communicates to the second device information indicating which hole cards to view on the second device corresponding to an active table having focus on the first device.

22. The method of claim 1, wherein the set of information at a server represents financial record information and the first subset of the information comprises account identifying information and the second subset of the information comprises account balance information.

23. The method of claim 1, further comprising electronically storing at the server a parameter indicating whether subsets of the information are to be divided between two or more devices.

24. The method of claim 1, wherein the first and second subsets of information are application-specific, and wherein the first and second subsets of information derive from functions within a specific application.

25. A system for transmitting information to multiple electronic devices, the system comprising:
- an electronic data store configured for electronically storing a set of information at a server, wherein the first and second subsets of information are generated by the same application at the server and are specific to that application;
- a processor device programmed for:
- identifying a first subset of the information and identifying a second subset of the information;
- determining at the server whether both a first device in possession of and being directly operated by a first user and a second device also in possession of and being directly operated by the first user are accessible over at least one electronic communications network based on the first user being logged into the application at both the first and second devices;
- if and only if both the first and second devices are determined to be accessible by the server, then:
- transmitting a first subset of the information to the first device from the server; and
- transmitting a second subset of the information to the second device from the server,
- wherein the second subset of the information includes information not transmitted to the first device.

* * * * *